United States Patent [19]

Ihde, Jr.

[11] 3,945,955
[45] Mar. 23, 1976

[54] PLASTICIZED POLYVINYL CHLORIDE COMPOSITIONS CONTAINING SILICONE FROTHING AGENTS

[75] Inventor: Frederick J. Ihde, Jr., Mountain Lakes, N.J.

[73] Assignee: Diamond Shamrock Corporation, Cleveland, Ohio

[22] Filed: Dec. 16, 1974

[21] Appl. No.: 533,157

[52] U.S. Cl.... 260/2.5 P; 260/23 XA; 260/29.1 SB; 260/30.6 SB; 260/30.8 R; 260/31.8 S
[51] Int. Cl.².................................... C08J 9/00
[58] Field of Search................................ 260/2.5 P

[56] References Cited
UNITED STATES PATENTS

| | | | |
|---|---|---|---|
| 3,061,558 | 10/1962 | Alter | 260/2.5 P |
| 3,790,510 | 2/1974 | Flannigan | 260/2.5 P |

Primary Examiner—Richard B. Turer
Attorney, Agent, or Firm—Leslie G. Nunn

[57] ABSTRACT

Polyvinylchloride foam compositions are prepared by frothing. To prepare the compositions for frothing, the silicone surfactant frothing agents present in the composition are extended with oleophilic frothing aids which do not significantly detract from the hydrophobic and flame retardant properties of the foam. Further, the frothing aids may be used to control froth viscosity. From about 5.0 phr to about 10.0 phr of frothing aid is added to from about 2.0 phr to about 4.0 phr of frothing agent present in the composition. Stable, homogeneous mixtures of simple and complex oleophilic organic metallic compounds such as overbased alkaline earth alkyl phenates, lead hexoate, magnesium petroleum sulfonate, metal organophosphonates and metal organothiophosphonates with free acids of simple and complex organic phosphate and phosphite esters; organic nitrogen compounds such as amines and amine salts of sulfonic acids; simple and complex organic borate esters such as 2-ethylhexyl borate, trihexylene glycol biborate, and tricresyl borate are useful as frothing aids.

14 Claims, No Drawings

PLASTICIZED POLYVINYL CHLORIDE COMPOSITIONS CONTAINING SILICONE FROTHING AGENTS

BACKGROUND OF THE INVENTION

1. Field of the Invention:

This invention relates to vinyl chloride homopolymer and vinyl chloride copolymer foam compositions prepared by frothing. These compositions contain silicone surfactant frothing agents and oleophilic frothing aids.

2. Description of the Prior Art:

Techniques for the preparation of vinyl chloride homopolymer and vinyl chloride copolymer foam compositions from plastisols are well known in the polymer art. Also the literature on polyvinylchloride and actate modified polyvinylchloride resin plastisol preparation is quite extensive. Reference may be made to the following publications:

Boehm and Dietz, "Vinyl Froth Foams Via the Oakes Continuous Mixer," Diamond Shamrock Chemical Company Technical Service Information Report No. 3-71, Apr. 30, 1971.

Boehm and Dietz, "The 'Ulok' PVC Carpet Backing System," Diamond Shamrock Chemical Company Technical Service Information Report No. 4-71, May 5, 1971.

Simoneau, "Silicone Surfactants in Mechanically Frothed Vinyl Plastisol Foams," Rubber World, p. 49, August, 1970.

Renshaw and Garlick, "How to Back Carpets with PVC," SPE Journal, Vol. 28, p. 21 (1972).

Keil and Webb, "Mechnically Frothed Vinyl Plastisol Foams," Journal of Cellular Plastics, Vol. 6, No. 4, p. 3, July/August, 1970.

Polyvinylchloride (PVC) foam for use as carpet and rug backing and in other markets has certain inherent advantages over other foamed polymers. PVC foams for rug and carpet backing have high tensile and tear strengths; they are more resistant to scuffing, and they have stronger tuff-lock. Also, of significant importance, PVC foams are more fire retardant than other foam polymers.

There are three general methods for producing foam from plastisols . . . compressed gas, chemical blowing agents, and frothing (mechanical whipping). In the frothing method, the most widely used method for producing fine open cell foam, PVC foam is produced by mechanical whipping of the plastisol to incorporate air into the plastisol and then fusing the foam at a relatively low temperature of about 270° to about 290°F. About the only disadvantage of this relatively simple frothing method is the high cost of the silicone surfactant frothing agent.

Additional information on preparation of PVC foam compositions by frothing may be found in U.S. Pat. No. 3,511,788 - Keil - issued May 12, 1970 and U.S. Pat. No. 3,814,706 - Simoneau et al issued June 4, 1974. These patents described preparation of froths using silicone surfactant frothing agents and use of these froths in various applications including the coating of substrates such as rugs and carpets. The teachings of these patents as they apply to the preparation of froths and their use are incorporated by reference herein.

SUMMARY OF THE INVENTION

Polyvinylchloride compositions for frothing contain 1. a foamable plastisol which is a mixture of
    a. a particulate resin such as a vinyl chloride homopolymer or a vinyl chloride copolymer containing a major portion of vinyl chloride and a minor portion of a copolymerizable dissimilar vinyl comonomer,
    b. one or more high boiling organic liquid plasticizers which is substantially a non-solvent for the particulate resin at room temperature but is capable to dissolving the particulate resin at an elevated temperature to form a single phase material which upon cooling to room temperature is a solid material,
2. from about 1 to about 5 phr of one or a mixture of silicone frothing agents, and
3. from about 5 to about 10 phr of a stable homogeneous frothing aid which is a mixture of a simple or complex oleophilic organic metallic compound such as a metal phenate, metal soap, metal organosulfonate, metal organophosphonate or metal organothiophosphonate with a free acid of a phosphate ester, a free acid of a phosphite ester, borate ester, organic nitrogen compound such as an amine or amine salt of sulfonic acid.

These compositions are prepared by mixing the plasticol, frothing agent and frothing aid. The compositions are prepared using foamable polyvinylchloride homopolymer and copolymer resin plastisols. The frothing agents are silicone surfactants. Suitable frothing aids include mixtures of simple or complex organic-metallic compounds such as overbased alkaline earth alkyl phenate (metal alkyl phenate), lead hexoate (metal soap), magnesium petroleum sulfonate (metal organosulfonate) as well as (metal organophonates) and (metal organothiophosphonates) derived from polyolefins and inorganic phosphorous reagents with free acids of simple or complex organic phosphate esters and phosphite esters; organic nitrogen compounds such as amines and amine salts of sulfonic acids; simple and complex organic borate esters such as 2-ethylhexyl borate, trihexylene glycol biborate, and tricresyl borates. These foam compositions are mechanically whipped to produce foams or froths, which are used in a variety of applications including coatings for substrates such as carpets and rugs. The frothing aids are also used to control froth vicosity.

DESCRIPTION OF THE PREFERRED EMBODIMENTS

The polyvinylchloride (PVC) foam compositions disclosed in this invention are mixtures of a foamable plastisol, a frothing agent and a frothing aid. These compositions may also contain fillers, pigments and vinyl resin stabilizers. The terms polyvinylchloride and PVC are used herein to characterize vinyl chloride homopolymers and vinyl chloride copolymers containing a dissimilar vinyl chloride comonomer. These terms are used commercially to describe the above homopolymers and copolymers as well as PVC - type and PVC modified polymers. See page 305 of Volume 14 of the Encyclopedia of Polymer Science and Technology. The plastisol is a dispersion of finely divided vinyl resin in a plasticizer.

Polyvinylchloride homopolymers and copolymers for plastisols are specifically designed vinyl resins for this purpose. With molecular weights in the 50,000 – 120,000 range, they have the particle size distribution and surface characteristics to form fluid plastisols with plasticizers. Normally they are called paste or dispersion resins.

The most commonly used copolymers contain 80 to 98% by weight polyvinylchloride and 2 to 20% by weight polyvinyl acetate.

Other useful PVC copolymers contain the indicated quantities of the following copolymerizable unsaturated monomers:

4 – 40% vinylidene chloride
5 – 20% acrylic ester such as methyl acrylate, octyl acrylate
5 – 40% vinyl esthers such as n-butyl vinyl ether, cetyl vinyl ether
5 – 20% maleic and fumaric esters such as diethyl maleate, di-2-ethylhexyl fumarate
5 – 40% acrylonitrile
3 – 8% ethylene
3 – 15% propylene The vinyl resin may be selected from one or more of the following groups:

1. PVC homopolymer dispersion grade resins
2. PVC-PVA copolymer dispersion grade resins
3. PVC homopolymer extender grade resins
4. PVC-PVA copolymer extender grade resins.

Both PVC homopolymer and PVC-PVA copolymer dispersion grade resins can be used in PVC compositions for foam carpet backings. PVC-PVA copolymer dispersion grade resins are often used in carpet backings because these resins produce foams which fuse at lower temperatures and have better tensile strengths and percent elongations than foams produced from PVC homopolymer dispersion grade resins.

Often PVC homopolymer of PVC-PVA copolymer extender grade resins are blended with PVC homopolymer or PVC-PVA copolymer dispersion grade resins to reduce the cost of the plastisol. Extender grade resins are also used to control viscosity of the plastisol as well as modify other physical properties. A ratio of 60–70 parts by weight of dispersion grade resin to 30–40 parts by weight of extender resin is suggested as the starting ratio in formulating PVC foam compositions.

Individual plasticizers or blends of plasticizers are used in foamable PVC compositions to impart flexibility to the finished foam. Plasticizers affect other physical properties of the foam as well as viscosity stability and low temperature fusing characteristics of the plastisol. Plasticizers are classified as either primary or secondary plasticizers depending on their effects on the resin base. For PVC foam it is important that the plasticizer produce a plastisol with the desired rheological properties. Depending on the density and quality of foam required, the plasticizer level may vary from 40 to 125 phr to vary the plastisol properties. A volatile diluent may be added to form an organosol which can aid in the cellular structure formation. Liquid plasticizers which are well known in the art and which are used in producing mechanically whipped or frothed foams, are classified according to the following combination of chemical composition and end use:

1. Phthalate plasticizers
2. Phosphate plasticizers
3. Low temperature plasticizers
4. High molecular weight plasticizers
5. Miscellaneous plasticizers Phthalate plasticizers are monomeric, general purpose primary plasticizers. They are probably the most widely used group of plasticizers and are used in most applications except in those applications where low temperature or flame resistance properties are required. Useful phthalate plasticizers include di-2-ethylhexyl phthalate, diisooctyl phthalate, dialphanol ($C_7$-$C_9$) phthalate, butylbenzyl phthalate, diisodecyl phthalate, dibutyl phthalate. Phosphate plasticizers are used in applications where flame retardance is important. Useful phosphate plasticizers include tritolyl phosphate, trixylyl phosphate, cresyl diphenyl phosphate, triisopropylated phenol phosphate, tributoxyethyl phosphate. Low temperature plasticizers include sebacates, adipates and azelates. These esters of aliphatic dibasic acids include di-2-ethylhexyl sebacate, dibutoxyethyl adipate, benzyloctyl adipate, dibenzyl sebacate, tetrabutyl thiodisuccinate. Other esters include polyesters such as poly (propylene sebacate), alochol modified, acid modified, ADMEX 433, DRAPEX 7.7 (Argus Chem.), Elastex 37-R (Allied Chem.), Flexol R2H (Carbide), Kodaflex polyesters (Eastman Kodak), Paraplex G-25 (Rohm & Haas). High molecular weight plasticizers are primarily polymeric materials such as Kodaflex NP-10 (Eastman Chem.), Morflex X-1080 (Chas. Pfizer), Plastolein 3702 (Emery). They are used in foam formulations where high temperature stability and solvent resistance are required. Epoxidized oils, even though they are not polymeric, are included in this group. Useful epoxidized oils include octyl epoxy stearate, epoxidized soybean oil, Harflex 2020 (Harchem), Monoplex S-70 (Rohm & Haas), Nuodex V-50 epoxy tall oil ester. These oils have the high molecular weights required for high temperature stability and have better low temperature properties than polymerics. Miscellaneous plasticizers include chlorinated paraffins, dipropylene glycol dibenzoate, long chain hydrocarbons, ethylene glycol monobutyl ether laurate, tricyclohexyl citrate, diisooctyl monoisodecyl trimellitate. This group also includes plasticizer blends which are prepared for specific applications by combining the properties of several plasticizers.

Non-solvating plasticizers tend to lower viscosity of the plastisol, whereas solvating plasticizers lower the fusion temperature of the plastisol. A starting ratio of about 60 parts by weight of a non-solvating plasticizer to about 20 parts by weight of a solvating plasticizer is suggested. The ultimate ratio will depend on the plasticizers selected.

Since the plasticizer is the continuous phase in the plastisol compound, it is of primary concern in the selection of the silicone surfactant frothing agent.

Selection of the silicone surfactant frothing agent depends on the resin as well as the plasticizer in the plastisol. Often efficiency of the silicone surfactant can be improved by using a blend of solvating and non-solvating plasticizers in the plastisol. These frothing agents are well known in the art. Exemplary of the silicone surfactant frothing agents are copolymers prepared by the cohydrolysis of $(CH_3)_3SiX$ and/or $Q(CH_3)_2SiX$ with $SiX_4$, wherein X is a hydrolyzable radical such as a halogen (chlorine, fluorine, bromine) or any alkoxy (methoxy, ethoxy, propoxy, butoxy, etc.) radical, employing, of course, such proportions as are necessary to obtain the desired $SiO_2$ to total $(CH_3)_3Si$ and $Q(CH_3)_2Si$ ratio of 1:0.6 to 1:1.2. Alternatively, copolymers can be prepared, for example, by reacting $(CH_3)_3SiCL$, $(CH_3)_3$—$SiOC_2H_5$ or $(CH_3)_3SiOSi(CH_3)_3$ with an acidic silica sol. This method is fully described in U.S. Pat. 2,676,182, the disclosure of said patent being incorporated herein by reference.

A particularly useful means for preparing modified copolymers containing both $(CH_3)_3SiO_{1/2}$ and $Q(CH_3)_2 SiO_{1/2}$ units involves cohydrolyzing a mixture of $(CH_3)_3SiX$ and $H(CH_3)_2 SiX$ with $SiX_4$ and then coupling the desired solubilizing group "Q" to the copolymer by reacting the hydrogen on the silicon atom with the unsaturated group of a compound which also contains the desired solubilizing group. This type of reaction is well known to those skilled in the art. The purpose of the solubilizing group in the radical Q is to make the copolymer compatible with plastisols which it might not be compatible with otherwise. Any solubilizing group can be present in the copolymers of this invention, the particular plastisol in which the copolymer is being used determines the choice of solubilizing group. Examples of solubilizing groups which can be present in the Q radical include carboxyl, ester, amide, amino, mercapto, halohydrocarbon, nitrile, nitro, carbonyl and higher hydrocarbon groups.

Another silicone resin is a silicone resin having $R_3SiO_{1/2}$ monofunctional units and $SiO_2$ tetrafunctional units with the ratio of the monofunctional units to the tetrafunctional units being from 0.25 to 0.75 with 3.0 to 5.0% by weight of hydroxyl groups and a silicone resin having $R^1_3SiO_{1/2}$ monofunctional units and $SiO_2$ tetrafunctional units and $R^2_2SiO$ difunctional units with the ratio of monofunctional units to tetrafunctional units to difunctional units being from 0.25 - 0.75 to 1 to 0.05-0.1 with 3.0 to 5.0% by weight of hydroxyl groups and wherein R, $R^1$, $R^2$ are monofunctional hydrocarbon radicals.

The essential characteristics of the silicone surfactants defined above are the siloxane units present in the copolymer surfactant, the ratio of these units and the compatibility of the surfactant with the plastisol. By being "compatible", it is meant that the surfactant is partially soluble and/or dispersible in the plastisol. Compatibility of the surfactant in the plastisol can be controlled in several ways. For example, one can choose a surfactant having the desired compatibility. Compatibility can be controlled by altering the Q radical. Still another alternative is to select a plasticizer for use in the plastisol which gives the desired degree of compatibility. It can be seen from the foregoing illustrations that silicone surfactants provide a maximum amount of flexibility which permits tailoring the surfactants and foamable compositions produced with the surfactants to meet specific specifications rather than vice versa.

The amount of surfactant used need only be sufficient to produce the desired foam density and will vary depending on the application. The amount of surfactant can vary from about 1 to about 5 phr of resin but this amount will depend on the resin and plasticizer selection as well as the desired foam density.

Since PVC polymers change color and harden on prolonged exposure to heat and light, conventional PVC heat and light stabilizers are used in foamable PVC compositions. From about 1 to about 5 phr of one or more of these PVC stabilizers may be added to the PVC foam composition. Chelated and unchelated metallic (barium, calcium, cadmium, zinc, magnesium) soaps and phenates, basic lead carbonate, tribasic lead sulfate, dibasic lead phosphites, organotins, may be used as stabilizers.

Fillers and pigments may also be used in PVC foam compositions. Fillers are used to reduce cost and pigments are used to add color to vinyl plastisol foams. The quantity of fillers may vary from about 10 to about 50 phr. When used, the quantity of pigments may vary from about 1 to about 2 phr.

Useful fillers include the most frequently used natural and precipitated calcium carbonates. Also calcined clays, talcs, barytes, aluminum oxides, calcium silicates, asbestos, diatomaceous earth, water ground mica, carbon and graphite, titanium dioxide may be used. PVC foam for furniture, automobiles, trains, planes, textiles, floorings, and carpet backing may be white, black, or colored. To obtain various colors, pigments such as benzidine yellow, chrome oxide green, Watchung Red (Pigment Red 48), phthalocyanine blue (Pigment Blue 15) may be used.

For the purpose of this invention, the term "frothing agent" is used to describe those silicone surfactants which actually foam the plastisol under mechanical agitation. The term "frothing aid" is used to describe those products which, although not being effective frothing agents by themselves, do increase the frothing activity of the silicone surfactants.

The frothing aid is used to extend the silicone surfactant frothing agent. From about 5.0 phr to about 10 phr of frothing aid is added to the foam composition. Useful oleophilic frothing aids include a mixture of the free acids of simple and complex organic phosphate mono and diesters and phosphite mono and diesters, organic nitrogen compounds such as amines, aminoamides, alkanolamides, imidazolines, quaternaries, and nitrogen-sulfur compounds, simple and complex organic borate esters such as 2-ethyl-hexyl borate, tri-hexylene glycol biborate, and tricresyl borates in combination with simple and complex olephilic organic metallic compounds such as a metal phenate, metal soap or metal organosulfonate. Phosphate esters include those surfactants described in Krupin, "Phosphate Ester Surfactants - Newer Uses"; Soap & Chemical Specialties, p. 86, May, 1969, which is incorporated by reference herein, may be used.

Examples of frothing aids include:

1. Free acids of simple and complex organic phosphate mono and diesters -

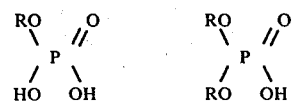

R = $C_8$ - $C_{20}$, or alkylphenyl or other aromatic. R may be alkoxylated (ethoxy, propoxy, butoxy).

Dicaprylacid phosphate, monolaurylacid phosphate, di (ethoxylated nonyl phenyl) phosphate, dioleyl acid phosphate, distearyl acid phosphate, chlorphenol acid phosphate, flurocarbon and fluorohydrocarbon acid phosphates (e.g., from pentadecafluorooctyl alcohol).

2. Phosphites - Free acids of organic acid phosphites such as didecyl hydrogen phosphite, dilauryl hydrogen phosphite, dioleyl hydrogen phosphite, di (2-ethylhexyl) hydrogen phosphite, diphenyl hydrogen phosphite, dioctadecyl hydrogen phosphite, decylphenyl hydrogen phosphite, lauryl dihydrogen phosphite, pentaerythritol hydrogen phosphite, bisphenol A hydrogen phosphite, thiophenol dihydrogen phosphite, dilauryldithio hydrogen phosphite, dinonylphenyl hydrogen phosphite, diallyl hydrogen phosphite, bromophenol hydrogen phosphite.

3. Amines - Primary, secondary, and tertiary amines. $RNH_2$, $R_2NH$, $R_3N$. R may be aliphatic (saturated or unsaturated), alicyclic, aromatic, or heterocyclic. Caprylamine, laurylamine, stearylamine, oleylamine, dilaurylamine, (cyclohexylmethyl) amine, aniline, 2-ethylhexylamine, t-alkyl primary amines (t-$C_{12}H_{25}NH_2$), trioctylamine, rosin amine, aminophenol, benzylamine, alkoxylated amines, N-alkyl trimethylene diamines from oleic or adipic acids, hydrogenated tallow amine, di-soya amine, N-coco morpholine, N-lauroyl ethylenediamine, benzylidenecylohexylamine, N-aliphatic polyamines, perfluorocylohexyl ($C_6F_{11}$) perfluorocyclohexyl 4. Amine salts of sulfonic acid - Lubrizol L 40209 (an amine neutralized petroleum sulfonate - 2.8% sulfur, 1.2% nitrogen), Conco AAS special - Triethanolamine neutralized dodecylbenzenesulfonate, benzenedisulfonamide, dialkylaminoalkyl mercaptan $R_2N(CH_2)_nSH$.

5. Simple and complex organic borate esters-2-ethylhexyl borate, trihexylene glycol biborate, tri-m,p-cresyl borate, 2-(betadimethylaminoethoxy)-4-methyl-1, 3, 2-dioxaborinane, tri-n-butyl borate, triisopropanolamine borate, 2, 6-di-tert-butyl-4-methylphenyl-di-n-butyl borate, lithium hexylene glycol monoborate, borate of N-hydroxyethyl-N- sec octadecylpiperazine, complexes such as of tetraphenylborate iridium, borate esters from polyols and boron trihalides, glycerine borate, brominated borate esters, fluroinated borate esters from fluorohydrocarbon alcohols.

6. Simple and complex metal phenates-barium thiophenate, overbased barium phenate, overbased calcium nonyl phenate, metal alkyl phenates, metal salts of long chain alkyl substituted salicylates.

7. Simple and complex metal soaps-strontium 2-ethylhexoate, stannous octoate, lead hexoate.

8. Simple and complex metal organosulfonates-magnesium petroleum sulfonate, calcium petroleum sulfonate, barium alkylbenzenesulfonate.

9. Simple and complex metal phosphonates and thiophosphonates.

Although organic nitrogen compounds increase frothing activity of silicone frothing agents in polyvinylchloride plastisols, they have a tendency at times to produce yellowish discoloration in cured and/or aged PVC foam. This discoloration does not detract from the exceptional properties of these PVC foams, but it is objectionable for certain uses where white or near white foam is desired.

It was found that this discoloration, which results primarily from use of primary and secondary fatty amines, can be eliminated or at least substantially reduced by replacing all or a substantial part of the organic nitrogen compounds with oil soluble, or at least oil dispersible, metallic salts and complexes.

Preparation of the metallic salts and complexes mentioned in (3) above is well known in the art and is not part of this invention, except insofar as they are further reacted with oil soluble or oil dispersible organic phosphates and/or borates. These metallic salts and complexes are described in the art as neutral, basic, or superbased metallic compounds of phenates, petroleum sulfonates carboxylates, organophosphonates, organothiophosphonates or combinations thereof. There are numerous patents disclosing their preparation, mainly for use in the petroleum and lubricant additives field. There are numerous literature references including the following:

"Lubricant Additives" by Dr. M. W. Ranney. Published by Noyes Data Corp., Park Ridge, N. J. 1973.

"Gear and Transmission Lubricants" by C. J. Boner. Published by Reinhold Publishing Corp. 1964.

"Lubricant Additives" by. C. V. Smalheer and R. Kennedy Smith. Published by Lezius-Hiles Co., Cleveland, Ohio 1967.

"Lubrication and Lubricants" by Eric R. Braithwaite. Published by Elsevier Publishing Co. 1967.

"Manufacture of a Highly Basic Engine Oil Detergent Additive" American Chemical Society, Division of Petroleum Chemistry - General Papers presented at Atlantic City Meeting, Sept. 13–18, 1959, pages 45–50, by C. R. Dawson, H. Ratner, and L. R. Roberts. "Status of Lubricants, Friction, and Wear" by R. C. Bowers and C. M. Murphy. NRL Report 6466. Naval Research Laboratories, Washington, D.C., pages 57–89.

Typical patents include U.S. Pat. Nos. 2,361,476; 2,426,540; 2,451,346; 2,501,731; 2,501,732; 3,036,971; 3,350,308; 3,351,552; 3,367,430; 3,388,063; 3,376,222 disclosing the use of alkaline earth, magnesium, lithium, and other basic and superbasic compounds and complexes.

The normal salt of an acid contains the stoichiometric amount of metal required to neutralize the acidic constituents. A basic salt contains more (usually twice) metal than is required to neutralize the acidic constituents. A superbasic salts contains a large excess (sometimes 3 to 15 times the amount) of metal above that required for stoichiometric neutralization; significant amounts of the excess metal being collodially dispersed as usually the carbonate, sometimes the oxide or hydroxide.

The metallic compounds and complexes of this invention are not effective frothing aids by themselves but are when used in combination with silicone frothing agents. They must be blended or reacted with oil soluble or oil dispersible organic phosphorus, boron, and/or nitrogen compounds. When reacted with the acidic organic phosphates, the carbonated superbased metallic compounds, with Base Numbers of approximately 40 to 300 or higher, liberate carbon dioxide. Also, normal, basic, and superbased metallic compounds and complexes, which do not have sufficient solubility in organic solvents such as plasticizers, can be solubilized by reaction with or blending with the organic phosphorus, boron and/or nitrogen compounds.

In addition to reducing or eliminating discoloration of PVC foam caused by certain organic nitrogen compounds, these metallic compounds and complexes are also useful in controlling viscosity of wet PVC froths.

Among the compounds and complexes which may be useful in increasing frothing activity of silicone surfactant frothing agents in combination with organic phosphorus, boron, and nitrogen compounds, there may be mentioned:

The normal, basic, and super basic metal salts of alkylphenols, alkylphenol sulfides, and alkylphenolaldehyde condensation products.

The normal, basic and superbasic metal salts of petroleum sulfonic (commonly called "mahogany") acids and alkyl substituted benzene and naphthalene sulfonic acids.

The normal, basic and superbasic metal salts of phosphonic and thiophosphonic acids for the reaction of polyolefins (e.g. polyisobutenes) with inorganic phosphorus reagents (e.g. phosphorus pentasulfide).

The normal, basic, and superbasic metal salts (carboxylate and carboxylate-phenate salts) of long chain alkyl substituted salicylic acids.

The preferred metallic constituents for the preparation of the frothing aids include barium, calcium, and lead. However, other alkaline earth constituents, cesium, magnesium, lithium, and tin, among others, are also of value. It is realized that not all metallic constituents form basic and/or superbasic compounds and complexes readily and that additives, such as catalysts, solvents, and the like, may be required to produce these compounds.

Among the acidic constituents used to prepare the normal, basic, and superbasic metallic compounds and complexes may be listed alkyl phenols such as octyl phenol and dinonyl phenol, alkylphenol-aldehyde condensation products such as that from tertiary amylphenol and formaldehyde, alkylphenol sulfides such as tertiary octylphenol sulfide, alkyl or alkenyl substituted cyclopentanoic acids, alkylated benzene sulfonic acid (molecular weight 450), alkylsubstituted salicylic acids such as dissopropyl or isooctyl salicylic acids, abietic acid, betaphenylpropionic acid, chlorophenylstearic acid, dichlorostearic acid, diisobutyl phenol, dimer and trimer acids, diphenylphosphinodithioic acid, dodecanedioic acid, dodecenyl succinic anhydride, hexachloroendomethylene tetrahydrophthalic acid, linoleic acid, Nadic methyl anhydride, naphthenic acid, neo-decanoic acid, oleic acid, paratertiary butylbenzoic acid, phenanthrene butyric acid, polyisobutylenesuccinic acid anhydride, rosin and rosin acids, tall oil and tall oil acids, triglycerides, Versatic Acid, metallic complexes such as those of the succinamide of polyisobutenylsuccinic anhydride and diethylene triamine.

These normal, basic, and superbasic metallic compounds and complexes may be prepared in volatile and/or non-volatile organic solvents. The solvents may be benzene, toluene, xylene, mineral oil, kerosene, plasticizers previously discussed in this invention, as well as other solvents well known in the art. These solvents may be used alone or in combination with catalysts, superbasing additives, etc.

The frothing aids of this invention are easily prepared by simple blending of the organic phosphorus, boron, and nitrogen constituents and components with the metallic compounds and complexes and then heating with agitation to 90°C to 100°C. They may be heated higher, for example to 150°C, but not significant advantage is obtained except in those cases where water of reaction decreases the shelf-life of the frothing aids. Where superbased metallic compounds and/or complexes are reacted with organic acid phosphates, care should be taken because the liberated carbon dioxide produces considerable foam. Advantage can be taken of this carbon dioxide liberation by reacting the superbased metallic compound or complex with the organic acid phosphate in the plastisol which will be used to produce the PVC foam.

The metallic compounds and complexes may be used at about 10 to 75% by weight of the frothing aid composition with the preferred amount being about 20 to 30% by weight. The metallic compounds and complexes may be blended with silicone frothing agent before being blended with other frothing aid constituents and components. However, no significant advantage has been obtained in frothing activity at this stage of the art by doing this. Neither has any significant advantage been found in adding various constituents and components individually to the plasticizer or plastisol before foaming the froth except, as previously mentioned, where carbon dioxide is liberated. Those skilled in the art of producing mechanical PVC foam generally study modes of addition of frothing agents and frothing aids to produce the most economical foam with exceptional properties.

Useful frothing aid mixtures includes a mixture of an overbased calcium phenate, a free acid of tridecyl alcohol phosphate ester and a trihexyleneglycol biborate; a mixture of an overbased calcium phenate, a free acid of an oleyl alcohol ethoxylate phosphate ester and a 2-ethylhexyl borate; a mixture of an overbased calcium alkylbenzenesulfonate, a free acid of oleyl alcohol ethoxylate phosphate ester, and a 2-ethylhexyl borate; a mixture of an overbased calcium phenate, and a free acid of $C_8$ - $C_{10}$ alcohol phosphate ester; a mixture of an overbased calcium phenate, a lead ethylhexoate, and a 2-ehtylhexyl borate; a mixture of an overbased calcium phenate, an alkyd resin and a 2-ethylhexyl borate; a mixture of an overbased barium phenate, a free acid of tridecyl alcohol phosphate ester, a trihexyleneglycol biborate, and a tertiary ($C_{12}$ - $C_{14}$) primary amine; a mixture of an overbased calcium phenate, and a free acid of diphenyl phosphite ester, a trihexyleneglycol biborate, and a dicocoamine.

A simple screening test may be used to determine whether or not a given mixture of compounds will foam a vinyl resin plastiscol. If a compound does not foam the plasticizer, it will not foam a plastisol prepared with the plasticizer. Since other plastisol compounds such as the vinyl resins, other plasticizers, stabilizers, fillers and pigments present in the foam composition will also influence the foaming ability of frothing agents and frothing aids, it is possible that a mixture of compounds which passes a simple plasticizer foaming screening test (which may be as simple as shaking 2.5 g of potential frothing agent or frothing aid in 50 g of plasticizer for 10 sec in a bottle) may fail in the actual plastisol frothing test. However, this simple plasticizer screening test does make it possible to discover that certain organic phosphorus, boron, nitrogen compounds and mixtures of these compounds will increase the foaming activity of the silicone frothing agents with the result that less silicone frothing agent is required to produce the same froth and fused foam densities.

The following plastisol formulation may be used to evaluate the frothing aids of this invention:

| | |
|---|---|
| Vinyl resin, dispersion grade | 60.0 parts |
| Fast fusing homopolymer extender PVC resin | 40.0 parts |
| No. 10 Whiting | 20.0 parts |
| Plasticizer | 75.0–85.0 parts* |
| Silicone frothing agent | 2.0–4.0 parts |
| Vinyl resin stabilizer | 1.0 parts |
| Frothing aid | 5.0–10.0 parts |

*Normally in this typical carpet backing plastisol formulation for PVC foam production, 85.0 parts of plasticizer is used. However, when a frothing aid is used, the plasticizer content can be reduced by an amount equal to the amount of frothing aid added.

In evaluation of the frothing aid, approximately 624 g of plastisol containing the frothing agent and frothing aid is whipped for 5 minutes using a Model N-50 Hobart Mixer with wire whip, at Speed No. 2 (the most effective speed for lowest density froth and fused foam)

to froth the plastisol. Froth density is determined using 9 oz paper cups. A Brookfield Synchron-Lectric Viscometer, Model LVF, Spindle No. 4, Speed 12, is used to measure froth viscosity. The resulting vinyl resin plastisol froths are then fused in aluminum trays at 280°F in a forced air oven for 10 minutes to obtain approximately 6 × 2¾ × ¼ inch PVC fused foams. Foams are weighed and densities calculated. Surface characteristics, cell structure, odor, and color are also noted.

Mixing equipment commonly used to froth or foam vinyl plastisols mechanically include the Oakes foamer (E. T. Oakes Corporation, Islip, N.Y.) and the Texacote foamer (Textile Rubber and Chemical Company, Dalton, Ga.). Foam can be produced continuously by feeding the foam composition into the mixing chamber of the Oakes foamer at a constant rate using a positive displacement variable speed pump. The mixing chamber employs sets of teeth or pins both on the rotating and stationary meshing units. The small clearance between the two units produces a high rate of shear which facilitates dispersion of an air stream into the foam composition.

The resulting foams are heated at about 250°F to about 320°F to fuse the foam. Some foams expand during the fusion steps in these tests when frothing aids are used in combination with silicone surfactants. This is an important feature because more foam can be produced from an equal weight of plastisol.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, l, °C, °F, lb, ft³, phr, cps are used to indicate grams, liters, degrees Centigrade, degrees Fahrenheit, pounds, cubic feet, parts per hundred parts resin, centipoises respectively, in these examples.

EXAMPLE 1

The various compounds shown in Table I are evaluated as frothing aids to extend the silicone surfactant frothing agent in the following foamable plastisol formulation:

| Component | Concentration phr |
|---|---|
| Vinyl resin, dispersion grade | 60.0 |
| Fast fusing homopolymer extender PVC resin | 40.0 |
| No. 10 Whiting | 20.0 |
| Plasticizer | 75.0–85.0 |
| Silicone frothing agent | 2.0–4.0 |
| Vinyl resin stabilizer | 1.0 |
| Frothing aid | 5.0–10.0 |

The plasticizer is Eastman CB-A (a blend of butyl benzyl phthalate, isobutyrate viscosity depressant and butyl octyl phthalate). Normally in this typical carpet backing plastisol formulation for PVC foam production, 85.0 phr of plasticizer is used. However, when a frothing aid or a mixture of frothing aids is used, plasticizer content may be reduced by an amount equal to the amount of the frothing aid added. The silicone surfactant frothing agent used in these tests is General Electric SS4255, a 50% solvent solution of silicone surfactant.

The quantities of the compounds shown in Table I are mixed to obtain frothing aid mixtures as clear, stable, viscous liquids. Exothermic reactions may occur when certain compounds such as the Phosphorous Compounds, e.g., organic phosphate esters are mixed with Nitrogen Compounds and reaction temperatures as high as 85°C may be obtained during mixing. Reactions also occur with liberation of carbon dioxide when overbased alkaline earth phenates are mixed with acid organic phosphates. When Boron Compounds, e.g., borate esters are added to these mixtures, the resulting mixtures are heated to 95° to 100°C. All mixtures are heated to 95° to 100°C.

Each frothing aid mixture is evaluated by mechanically whipping approximately 624 g of plastisol containing silicone surfactant and frothing aid for 5 minutes using a Model N-50 Hobart Mixer with wire whip, at Speed No. 2 (the most effective speed for lowest density froth and fused foam). Froth density is measured in a 9 oz paper cup. A Brookfield Synchro-Lectric Viscometer, Model LVF, Spindle No. 4, Speed 12, is used to measure froth viscosity. The resulting foamed vinyl resin plastisol is fused in an aluminum tray at 280°F in a forced air oven for ten minutes to obtain approximately 6 × 2¾ × ¼ inch sample of PVC fused foam. Each fused foam sample is weighed and its density calculated. Surface characteristics, cell structure, odor, and the color of each foam sample are noted.

Controls used for determining effectiveness of frothing aiads are the froth densities and fused foam densities obtained with 4.0, 3.0 and 2.0 phr silicone frothing agent in the plastisol formulation without a frothing aid. Any frothing aid or mixture of frothing aids, which produces lower froth densities and fused foam densities than those obtained with 2.0 phr frothing agent in the controls, is considered to be an improved product of this invention.

TABLE I

MECHANICAL FOAM TESTS WITH PLASTISOL CONTAINING 2 phr SILICONE SURFACTANT
Composition of Frothing Aid

| Foam Test Number | phr Frothing Aid | % Phosphorus Compound | % Boron Compound | % Other Compounds | Froth Brookfield Viscosity cps | Froth Density g/l | Fused Foam Density lb/ft³ |
|---|---|---|---|---|---|---|---|
| 1 | 8.0 | 25 CROD N3 | 50 Q | 25 Ca Ph | 13500 | 600 | 25.2 |
| 2 | 8.0 | — | 50 Q | 25 Ca Ph 25 LEAD-HEX | 24250 | 530 | 25.3 |
| 3 | 10.0 | 25 CROD N3 | 50 Q | 25 Ca Sulf 4.8 | 17750 | 575 | 26.2 |
| 4 | 10.0 | — | 50 Q | 25 Ca Ph 25 TRITON B1956 | 13500 | 590 | 26.5 |
| 5 | 4.0 | — | 50 Q | 25 Ca Ph 25 LEAD-HEX | 19000 | 590 | 26.6 |
| 6 | 10.0 | — | 50 Q | 25 Ca Ph 25 LEAD-HEX | 18500 | 560 | 27.0 |

TABLE I-continued

MECHANICAL FOAM TESTS WITH PLASTISOL CONTAINING 2 phr SILICONE SURFACTANT

| Foam Test Number | phr Frothing Aid | Composition of Frothing Aid | | | Froth Brookfield Viscosity cps | Froth Density g/l | Fused Foam Density lb/ft³ |
|---|---|---|---|---|---|---|---|
| | | % Phosphorus Compound | % Boron Compound | % Other Compounds | | | |
| 7 | 8.0 | 25 CROD N3 | 50 Q | 25 Ca Sulf 3.2 | 17750 | 575 | 27.6 |
| 8 | 2.0 | 25 CROD N3 | 50 Q | 25 Ca Ph | 17500 | 590 | 27.6 |
| 9 | 4.0 | 25 CROD N3 | 50 Q | 25 Ca Ph | 17250 | 600 | 27.8 |
| 10 | 6.0 | — | — | 50 Ca Ph 50 Am Sulf 2.85 | 23250 | 600 | 27.8 |
| 11 | 8.0 | 50 W | — | 50 Ca Ph | 20750 | 530 | 27.9 |
| 12 | 2.0 | — | 50 Q | 25 Ca Ph 25 TRITON B1956 | 20250 | 600 | 28.2 |
| 13 | 10.0 | — | — | 50 Ca Ph 50 Am Sulf 2.85 | 20250 | 600 | 28.5 |
| 14 | 4.0 | — | 50 Q | 25 Ca Ph 25 LEAD-HEX | 23250 | 580 | 28.6 |
| 15 | 4.0 | — | — | 50 Ca Ph 50 Am Sulf 2.85 | 25500 | 600 | 28.9 |
| 16 | 6.0 | — | 50 Q | 25 Ca Ph 25 TRITON B1956 | 17500 | 610 | 29.0 |
| 17 | 6.0 | 25 CROD N3 | 50 Q | 25 Ca Sulf 3.2 | 20750 | 590 | 29.1 |
| 18 | 10.0 | 25 CROD N3 | 50 Q | 25 Ca Sulf 3.2 | 15000 | 560 | 29.2 |
| 19 | 8.0 | — | 50 Q | 25 Ca Ph 25 TRITON B1956 | 14500 | 595 | 29.5 |
| 20 | 6.0 | 25 RA600 | 50 Q | 25 Ca Ph | 22000 | 595 | 29.6 |
| 21 | 4.0 | 50 W | — | 50 Ca Ph | 26000 | 600 | 30.9 |
| 22 | CONTROL | | | 2.0 phr GENERAL ELECTRIC SS4255 | 23500 | 620 | 32.1 |

EXAMPLE II

The procedure of Example I is repeated with the exceptions that the silicone surfactant frothing agent used in the plastisol formulation is Dow Corning 1250, a 50% xylene solution of silicone surfactant and the plasticizer is butyl ethylhexl phthalate. Results of these tests are shown in Table II.

TABLE II

MECHANICAL FOAM TESTS WITH PLASTISOL CONTAINING 2 phr SILICONE SURFACTANT

| Foam Test Number | phr Frothing Aid | Composition of Frothing Aid | | | Froth Brookfield Viscosity cps | Froth Density g/l | Fused Foam Density lb/ft³ |
|---|---|---|---|---|---|---|---|
| | | % Phosphorus Compound | % Boron Compound | % Other Compounds | | | |
| 23 | 10.0 | 50 ACT T | 25 B7 | 25 Ca Ph 7.2 | 19400 | 505 | 22.8 |
| 24 | 7.5 | 25 ACT T | 25 B7 | 25 Ba Ph 25 81R | 17000 | 540 | 25.6 |
| 25 | 5.0 | 25 ACT T | 25 B7 | 25 Ca Ph 25 81R | 23500 | 565 | 27.0 |
| 26 | 10.0 | 25 ACT T 25 W | — | 25 Ca Ph 25 2C | 23000 | 575 | 27.2 |
| 27 | 10.0 | 25 ACT T | 25 B7 | 25 Ba Ph 25 81R | 16500 | 535 | 27.8 |
| 28 | 5.0 | 25 DPP | 25 B7 | 25 Ca Ph 25 JMT | 20500 | 570 | 28.3 |
| 29 | 10.0 | 25 DPP | 25 B7 | 25 Ca Ph 25 2C | 20750 | 585 | 28.3 |
| 30 | 5.0 | 25 ACT T | 25 B7 | 25 Ba Ph 25 81R | 18000 | 560 | 28.5 |
| 31 | 5.0 | 25 DPP | 25 B7 | 25 Ca Ph 25 81R | 22500 | 560 | 28.9 |
| 32 | 10.0 | 25 ACT T | 25 B7 | 25 Ca Ph 25 81R | 22750 | 550 | 29.2 |
| 33 | 5.0 | 25 DPP | 25 B7 | 25 Ca Ph 25 2C | 18000 | 595 | 29.3 |
| 34 | 7.5 | 25 ACT T | 25 B7 | 25 Ca Ph 25 81R | 23500 | 560 | 29.7 |
| 35 | CONTROL | | | 2.0 phr DOW CORNING 1250 | 22000 | 580 | 30.8 |

KEY TO TABLES I AND II

| | |
|---|---|
| ACT T | ARTHUR C. TRASK CO., ACTROFOS T, acid form tridecyl alcohol phosphate ester |
| Am Sulf 2.85 | LUBRIZOL CORP. L40209 experimental amine neutralized petroleum sulfonate |
| B7 | U.S. BORAX BORESTER 7, trihexyleneglycol biborate |
| Ba Ph | LUBRIZOL CORP. LUBRIZOL 2103 overbased liquid barium complex, 23.5% barium |
| 2C | ARMOUR ARMEEN 2C, dicocoamine |
| Ca Ph | LUBRIZOL CORP. 24697L overbased calcium nonylphenate 4.7% calcium |
| Ca Ph 7.2 | LUBRIZOL CORP. LUBRIZOL 2105 overbased calcium nonylphenate 7.2% calcium |
| Ca Sulf 3.2 | LUBRIZOL CORP. OS40208 calcium alkylbenzene sulfonate 3.2% calcium, 2.9% sulfur, base no. 40 |
| Ca Sulf 4.8 | LUBRIZOL CORP. OS13463 calcium alkylbenzene sulfonate 4.8% calcium, 3.0% sulfur, base no. 85 |
| CROD N3 | CRODA INC. CRODAFOS N3, acid form phosphated oleyl ether |
| DPP | EASTMAN diphenyl phosphite |

TABLE II-continued
MECHANICAL FOAM TESTS WITH PLASTISOL CONTAINING 2 phr SILICONE SURFACTANT

| Foam Test Number | phr Frothing Aid | Composition of Frothing Aid | | | Froth Brookfield Viscosity cps | Froth Density g/l | Fused Foam Density lb/ft³ |
| --- | --- | --- | --- | --- | --- | --- | --- |
| | | % Phosphorus Compound | % Boron Compound | % Other Compounds | | | |
| JMT | | Rohm and Haas PRIMENE JM-T, Tert ($C_{18}$—$C_{22}$) primary amine | | | | | |
| LEAD HEX | | MOONEY CHEMICALS INC. Lead 2-ethylhexoate 24% lead | | | | | |
| Q | | 2-ethylhexyl borate | | | | | |
| RA 600 | | GAF GAFAC RA600 acid organic phosphate | | | | | |
| TRITON B1956 | | ROHM and HAAS modified phthalic glycerol alkyd resin | | | | | |
| W | | Free acid phosphate ester $C_8$—$C_{10}$ alcohols | | | | | |
| 81R | | Rohm and Haas PRIMENE 81R, tert ($C_{12}$—$C_{14}$) primary amine | | | | | |

While the invention has been described with reference to certain specific embodiments thereof, it is understood that it is not to be so limited since alterations and changes may be made therein which are within the full intended scope of the appended claims.

What is claimed is:

1. A composition for producing a foam by mechanically whipping comprising:
  a. a plastisol which is a mixture of
    1. a particulate resin selected from the group consisting of a vinyl chloride homopolymer and a vinyl chloride copolymer of a major portion of a vinyl chloride monomer and a minor portion of a copolymerizable dissimilar vinyl comonomer, and
    2. a high boiling organic liquid plasticizer which is substantially a non-solvent for the particulate resin at room temperature but is capable of dissolving the particulate resin at elevated temperature to form a single phase material which upon cooling to room temperature is a solid material,
  b. from about 1 to about 5 phr of a silicone frothing agent, and
  c. from about 5 to about 10 phr of an oleophilic frothing aid which is a stable, homogeneous mixture of
    1. at least one member selected from the group consisting of a metal phenate, a metal soap, a metal organosulfonate, a metal organophosphonate and a metal organothiophosphonate wherein the metal is selected from the group consisting of sodium, potassium, lithium, barium, calcium, strontium, cesium, magnesium, lead and tin, the member being oleophilic or forming an oleophilic reaction product with another component present in the composition, and
    2. at least one member selected from the group consisting of a free acid of a phosphate ester, a free acid of a phosphite ester, a borate ester, an amine, an amine salt of a sulfonic acid and an alkyd resin wherein the ester moiety in the phosphate ester, phosphite ester and borate ester is alkyl, alkenyl, aryl, substituted alkyl, substituted alkenyl, substituted aryl or an alkoxylate thereof.

2. The composition of claim 1 wherein the silicone frothing agent is a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with said plastisol and the ratio of $SiO_2$ units to the total $(CH_3)_3Si$ and $Q(CH_3)_2Si$ unit is in the range of 1:0.6 to 1:1.2.

3. The composition of claim 1 wherein the resin is selected from the group consisting of
  1. homopolymers of vinyl chloride, and
  2. copolymers of vinyl chloride containing in an amount up to about 40% by weight of said copolymer of at least one ethylenically unsaturated monomer copolymerizable therewith selected from the group consisting of vinyl acetate, vinylidene chloride, esters of acrylic acid, vinyl ethers, esters of maleic acid, esters of fumaric acid, acrylonitrile, ethylene and propylene.

4. The composition of claim 1 wherein the member of (c) (1) is selected from the group consisting of metal alkyl phenate, metal soap, and metal organosulfonate.

5. The composition of claim 1 wherein the frothing aid is a mixture of
  a. an overbased calcium phenate,
  b. a free acid of an oleyl alcohol ethoxylate phosphate ester, and
  c. a 2-ethylhexyl borate.

6. The composition of claim 1 wherein the frothing aid is a mixture of
  a. an overbased calcium alkylbenzenesulfonate,
  b. a free acid of oleyl alcohol ethoxylate phosphate ester, and
  c. a 2-ethylhexyl borate.

7. The composition of claim 1 wherein the frothing aid is a mixture of
  a. an overbased calcium phenate, and
  b. a free acid of $C_8$ - $C_{10}$ alcohol phosphate ester.

8. The composition of claim 1 wherein the frothing aid is a mixture of
  a. an overbased calcium phenate,
  b. a lead ethylhexoate, and
  c. a 2-ethylhexyl borate.

9. The composition of claim 1 wherein the frothing aid is a mixture of
  a. an overbased calcium phenate,
  b. an alkyd resin, and
  c. a 2-ethylhexyl borate.

10. The composition of claim 1 wherein the frothing aid is a mixture of
  a. an overbased barium phenate,
  b. a free acid of tridecyl alcohol phosphate ester,
  c. a trihexyleneglycol biborate, and
  d. a tertiary ($C_{12}$ - $C_{14}$) primary amine.

11. The composition of claim 1 wherein the frothing aid is a mixture of
  a. an overbased calcium phenate,
  b. a free acid of diphenyl phosphite ester,
  c. a trihexyleneglycol biborate, and
  d. a dicocoamine.

12. The composition of claim 1 wherein the frothing aid is a mixture of
   a. an overbased calcium phenate,
   b. a free acid of tridecyl alcohol phosphate ester, and
   c. a trihexyleneglycol biborate.

13. A process for producing a foam which comprises mechanically whipping the composition of claim 1 to obtain a froth and then heating the froth to obtain a fused, open-celled foamed composition.

14. A substrate coated with the cured, open-celled, foamed composition produced by the process of claim 13.

* * * * *

UNITED STATES PATENT AND TRADEMARK OFFICE
CERTIFICATE OF CORRECTION

PATENT NO. : 3,945,955
DATED : March 23, 1976
INVENTOR(S) : Frederick J. Ihde, Jr.

It is certified that error appears in the above-identified patent and that said Letters Patent are hereby corrected as shown below:

Column 3, line 12, "esthers" should be --ethers--. Column 6, line 20, "incresae" should be --increase--. Column 7, lines 13 and 14, delete --perfluorocyclohexyl--; column 7, line 14, insert --amines.--. Column 9, line 24, "dissopropyl" should be --diisopropyl--. Column 12, line 47, "aiads" should be --aids--.

Signed and Sealed this

Thirty-first Day of October 1978

[SEAL]

Attest:

RUTH C. MASON
Attesting Officer

DONALD W. BANNER
Commissioner of Patents and Trademarks